United States Patent [19]

Tosey et al.

[11] Patent Number: 5,913,921
[45] Date of Patent: Jun. 22, 1999

[54] SYSTEM FOR COMMUNICATING INFORMATION ABOUT NODES CONFIGURATION BY GENERATING ADVERTISEMENTS HAVING ERA VALUES FOR IDENTIFYING TIME REFERENCE FOR WHICH THE CONFIGURATION IS OPERATIVE

[75] Inventors: Joseph P. R. Tosey, Burnaby; Andrei Godoroja, North Vancouver; James H. Belton, Port Coquitlam, all of Canada

[73] Assignee: Glenayre Electronics, Inc., Charlotte, N.C.

[21] Appl. No.: 08/795,063

[22] Filed: Feb. 5, 1997

Related U.S. Application Data

[60] Provisional application No. 60/021,617, Jul. 12, 1996, and provisional application No. 60/022,045, Jul. 22, 1996.
[51] Int. Cl.$^6$ .................................................. G06F 13/00
[52] U.S. Cl. .......................................................... 709/220
[58] Field of Search ........................... 395/200.5, 182.01, 395/182.11, 200.51, 200.52, 200.53, 200.54, 200.72; 340/825.44; 709/220

[56] References Cited

U.S. PATENT DOCUMENTS

| | | | |
|---|---|---|---|
| 5,138,615 | 8/1992 | Lamport et al. | 370/400 |
| 5,276,680 | 1/1994 | Messenger | 370/311 |
| 5,331,634 | 7/1994 | Fischer | 370/405 |
| 5,511,188 | 4/1996 | Pascucci et al. | 707/203 |
| 5,574,860 | 11/1996 | Perlman et al. | 395/200.5 |
| 5,652,908 | 7/1997 | Douglas et al. | 395/182.02 |
| 5,724,509 | 3/1998 | Starkweather et al. | 395/200.5 |
| 5,751,967 | 5/1998 | Raab et al. | 395/200.58 |

OTHER PUBLICATIONS

J. Moy, OSPF Version 2, RFC 1583, Proteon, Inc., Mar. 1994, pp. 107, 100, 104, 45, 129.
Internet–Draft, *SNDM Protocol Specification*, K. Dobbins et al., Cabletron Systems Incorporated, Apr. 1997.
Press Release, *Cisco's New Hot Standby Router Protocol Brings Fast Re–Routing to the Desktop*, Jun. 21, 1994.
Internet Engineering Task Force, Request for Comments: 1058, *Routing Information Protocol*, C. Hedrick, Rutgers University, Jun. 1988.
Internet Engineering Task Force, Request for Comments: 1388, *RIP Version 2, Carrying Additional Information*, G. Malkin, Xylogics, Inc., Jan. 1993.
Internet Engineering Task Force, Request for Comments: 1583, *OSPF Version 2*, J. Moy, Proteon, Inc., Mar. 1994.

*Primary Examiner*—Moustafa M. Meky
*Attorney, Agent, or Firm*—Christensen, O'Connor, Johnson & Kindness, PLLC

[57] ABSTRACT

An improved computer network and methods for determining current configurations of abstract nodes is accomplished by using era values in the configurations of the abstract nodes. Abstract nodes which represent network components within the network have access to databases containing recorded node configurations. Associations between nodes are established when a node configuration is advertised and recorded in another node's database. Database information on node configurations is kept current by comparing the era value of each advertised node against the era value of the same node as recorded in the database. Since era values indicate a relative time reference for which the node configuration is operative, a more current era value indicates a more current node configuration. Abstract nodes are completely independent entities. As a result, a node's configuration may be independently modified by more than one component in the network. Application of the network in a hot-standby system is also disclosed.

21 Claims, 4 Drawing Sheets

Fig. 2

| 130 | 132 | 134 | 136 | 138 |
|---|---|---|---|---|
| NODE1 | ADDRESS | ERA | STATUS |
| NODE2 | ADDRESS | ERA | STATUS |
| NODE3 | ADDRESS | ERA | STATUS |
| ⋮ | ⋮ | ⋮ | ⋮ |

Fig. 3

200 → SWITCH A

| | NODE | ADDRESS | ERA | STATUS |
|---|---|---|---|---|
| 202 | A1 | A | 1996 | O.K. |
| 204 | A2 | A | 1996 | O.K. |

206 → SWITCH B

| | NODE | ADDRESS | ERA | STATUS |
|---|---|---|---|---|
| 208 | B1 | B | 1996 | O.K. |
| 210 | B2 | B | 1996 | O.K. |

Fig. 8

250 → SWITCH A

| | NODE | ADDRESS | ERA | STATUS |
|---|---|---|---|---|
| 252 | A1 | A | 1996 | ERROR |
| 254 | A2 | A | 1996 | O.K. |
| 256 | A1 | C | 1997 | O.K. |

260 → SWITCH B

| | NODE | ADDRESS | ERA | STATUS |
|---|---|---|---|---|
| 262 | B1 | B | 1996 | O.K. |
| 264 | B2 | B | 1996 | O.K. |
| 268 | A1 | A | 1996 | IGNORE |
| 270 | A2 | A | 1996 | O.K. |
| 272 | A1 | C | 1997 | O.K. |

280 → SWITCH C

| | NODE | ADDRESS | ERA | STATUS |
|---|---|---|---|---|
| 282 | A1 | C | 1997 | O.K. |

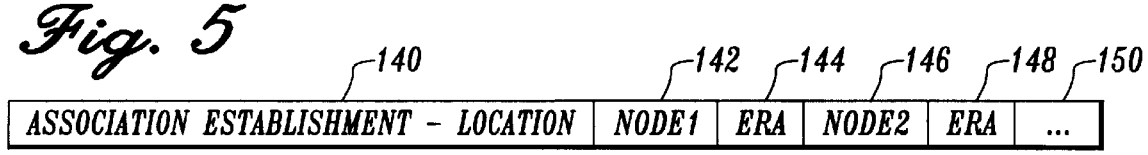
Fig. 5
| ASSOCIATION ESTABLISHMENT - LOCATION | NODE1 | ERA | NODE2 | ERA | ... |
Fig. 6A
| ASSOCIATION ESTABLISHMENT - SWITCH A | A1 | 1996 | A2 | 1996 |
Fig. 6B
SWITCH B
| NODE | ADDRESS | ERA | STATUS |
|------|---------|-----|--------|
| B1 | B | 1996 | O.K. |
| B2 | B | 1996 | O.K. |
| A1 | A | 1996 | O.K. |
| A2 | A | 1996 | O.K. |
Fig. 7A
| ASSOCIATION ESTABLISHMENT - SWITCH C | A1 | 1997 |
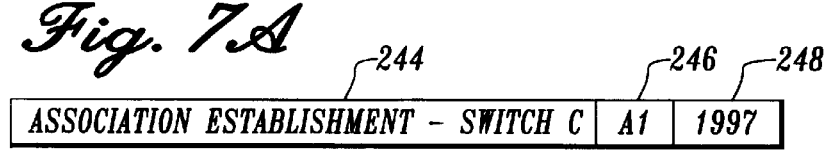
Fig. 7B
SWITCH C
| NODE | ADDRESS | ERA | STATUS |
|------|---------|-----|--------|
| A1 | C | 1997 | O.K. |

SYSTEM FOR COMMUNICATING INFORMATION ABOUT NODES CONFIGURATION BY GENERATING ADVERTISEMENTS HAVING ERA VALUES FOR IDENTIFYING TIME REFERENCE FOR WHICH THE CONFIGURATION IS OPERATIVE

This application claims the benefit of U.S. Provisional Application Ser. No. 60/021,617, filed Jul. 12, 1996, and U.S. Provisional Application Ser. No. 60/022,045, filed Jul. 22, 1996.

FIELD OF THE INVENTION

The invention relates to computer networks, particularly to computer networks and methods that use network advertisements to communicate current network configuration information, especially as applied in the field of wireless messaging or paging networks.

BACKGROUND OF THE INVENTION

Computer networks are configurable according to several different models. One model has a plurality of computing components communicatively interconnected enabling each component to request information from or send information to selected ones or all of the other components. Each component acts as a server and a client with respect to the other components. A computer network of such design is more efficient when one computing component knows beforehand which of the other components to contact for the exchange of desired information.

One method of ensuring that a networked computer knows which of other networked computers to contact is to construct limited, physical communication links between specific computers in the network. However, implementing communication control by this method proves to be highly inflexible. If a computer which provides information or services for other computers becomes unavailable (for reasons such as a voluntary maintenance shutdown or an involuntary system crash), network communication links have to be reconfigured so the other computers can request the information or services from another source. The process of reconfiguring physical communication links, often by the manipulation of physical switches, requires the expense of time and money. A similar reconfiguring cost is incurred when the original computer once again becomes available. The computers which formerly had a physical communication link with it would be reconfigured again to reestablish the original communication links. It is thus desirable to have a computer network with quicker and easier mechanisms for reconfiguring the communication links when the topology of the computer network changes.

While the network may use software instructions to implement such reconfigurations, the use of software raises new problems. For example, when a networked computer becomes unavailable, software instruction may be given to other computers to seek the desired information or services elsewhere. Subsequently, when the networked computer once again becomes available, software instruction may be sent informing the other computers to resume communication as originally configured. If distribution of the first instruction, for some reason, is delayed, the other computers would receive the first instruction (telling them to forward requests elsewhere) after the second instruction (telling them to resume communications). The other computers receiving instructions in such an order would become confused as to which computer they should forward information or service requests.

One method of synchronizing the communication of information in a computer network is observed in the routing algorithm Open Shortest Path First (OSPF), formally defined in Request for Comments (RFC) 1583, written by J. Moy and published by the Internet Engineering Task Force, March 1994. (RFCs are stored on Internet ftp servers managed by the U.S. Government. For instance, RFC 1583 may be found at the Internet address nic.ddn.mil/rfc/rfc1583.txt).

OSPF provides a method of synchronizing databases in computer network "routers." In OSPF, a router periodically advertises information describing its own database data (specifically, link state data) to a neighboring router and includes a sequence number that the neighboring router can use to detect old or duplicate advertisements. The router owning the database increases the sequence number when it originates a new instance of the advertisement. A larger sequence number signifies a more recent advertisement. While a scheme such as this is helpful in synchronizing information, it requires the router that owns the database to be involved in any change of data that it owns. Other routers, even if configured to handle the data owned by the particular router, cannot unilaterally step in and modify or "take over" the data. Sequence numbering and database data are owned by specific routers which must participate in any changes.

On the other hand, systems that do permit a database or resource owned by one device to be controlled by another device require the owner-device to track the location or control of the database resource. In such systems, when a device wants to access a particular resource, it must first inquire of the resource owner where the resource may be found. In order for the owner to always know where a resource is located, permission of the owner is required any time use of the resource is acquired by another device. The resource cannot independently transfer to another device's control.

Another feature desirable in a computer network is a "hot-standby" mode of operation. In hot-standby, a device capable of controlling a particular resource is connected to the network but does not control the resource. Instead, it waits for the device that does control the resource to become unavailable to the network (for reasons such as scheduled maintenance, power failure, equipment failure, or other causes). When the controlling device becomes unavailable, the hot-standby device automatically assumes control of the resource and preferably communicates its assumption of control to the rest of the network. Manual intervention by a network operator is not required for the takeover to occur. When the original device once again becomes available, it may at that time reassume control of the resource and similarly notify the rest of the network of its resumption of control. With respect to the resource, the hot-standby device would then return to a standby mode. Ideally, a hot-standby system provides a smooth transition for backup components to gain control when a main component becomes unavailable.

One recognized method of implementing a hot-standby system is known as IP Takeover. In IP Takeover, a hot-standby device can step in and begin responding to the network on behalf of the "unavailable" device. However, if the device is not really unavailable but only had a temporary failure in its network connection or is simply slow in responding, extreme havoc may result in the network. Both devices would be responding to the network, causing duplicate responses to be communicated. The network has no method of arbitration to determine which device is properly in control.

In the field of computer network routing, Cisco Systems of San Jose, Calif. has implemented a hot-standby system called "Hot Standby Router Protocol" (HSRP) that attempts to avoid such a dual-response problem. While HSRP does not enable the network to determine which device is properly active, it does attempt to limit the time that both devices are simultaneously active. HSRP has shown success but does so only under very controlled circumstances. The backup device and main device must sit side-by-side and carefully cross-monitor each other, permitting each to detect when the other is responding or not responding to the network. Because controlled cross-monitoring is required, it is difficult to have a hot-standby backup device at a location remote from the main device. Additionally, in IP Takeover, the backup device and main device must have the exact same IP network address. As such, both devices must be addressable on the same computer subnet.

Improved computer networking methods and apparatus that solve the above-stated problems are particularly desired in the field of wireless paging and messaging networks. In a typical wireless paging or messaging system, one or more input components receives messages left by callers for system subscribers. The messages are then relayed to one or more "home" database components which determines how to handle the subscriber's messages. Subsequently, the messages are forwarded to the proper output components for broadcast to the intended subscribers. The various components are linked via a computer communication network. The components, also known as switches, abide by certain rules in communicating with each other. These rules are known as an interswitch protocol.

A common interswitch protocol in present use is Telocator Network Paging Protocol (TNPP). Although TNPP was conceived initially to create a standard means of moving information between dissimilar paging terminals, it is widely used to create networks of similar paging terminals. TNPP is presently used to ensure delivery of information from one paging terminal to another paging terminal. It however does not provide solutions to the problems identified above.

SUMMARY OF THE INVENTION

Accordingly, the present invention is a computer network and methods that enable network components to readily discern current network configuration information. The invention is particularly advantageous for application in wireless messaging or paging switch networks.

The computer network is comprised of a plurality of communicatively interconnected components. Abstract software entities called "nodes" operate to represent the components in the network. The components identify and communicate with one another through their respective abstract nodes.

In the invention, the configuration of an abstract node is defined by several elements, including a unique identifier and an era value. The identifier identifies the node within the network. The era value serves to identify a time reference for which the configuration is operative. When a node configuration undergoes a change, e.g., when a node is reassigned from representing one network component to another, the node's era value is modified to signify that the node has entered a new era of operation, and in that era the new configuration information is operative. Configuration information on that node from a previous era is thereafter "out-of-date" and can be ignored.

Node configurations are communicated or "advertised" between network components to ensure that network components operate according to a current network configuration. When node configurations are advertised over the network, network components compare each node's advertised era value with era values recorded from previous advertisements for the same node. The comparison of era values is preferably accomplished by a two's complement subtraction operation. Network components that have a node's configuration information from a previous era (i.e., with a previous era value) recognize the new configuration as more current due to its modified era value.

A key to the invention is that the abstract nodes are completely independent entities. Each node has its own era value and is not "owned" by any one particular component. Nodes may be readily reassigned from representing one component to another without permission or instruction from any one particular network component, although a network of this invention may use a network resource to coordinate node era values.

The invention is particularly advantageous in implementing a hot-standby mode of operation. A network component serving as a backup for a "main" component may step in and unilaterally reassign the node representing the main component to itself when it senses the main component has become unavailable. Through advertising that the node has entered a new era and in that era the node now represents the backup component, the remaining network components recognize that the backup component has taken over the resources and responsibilities previously handled by the main component. A backup component may be connected anywhere within the network, even at a location remote from a main component.

As may be readily observed, the computer network and methods of the invention provide greater flexibility and efficiency in reconfiguring communication between components in computer networks.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 illustrates an association database;

FIG. 3 illustrates example association databases maintained by hypothetical switches A and B;

FIG. 5 illustrates an association advertisement;

FIG. 6A illustrates an example association advertisement communicated by hypothetical switch A;

FIG. 6B illustrates an example updated association database maintained by hypothetical switch B;

FIG. 7A illustrates an example association advertisement communicated by hypothetical switch C;

FIG. 7B illustrates an example association database maintained by hypothetical switch C; and FIG. 8 illustrates example updated association databases maintained by hypothetical switches A, B and C.

DETAILED DESCRIPTION OF THE PREFERRED EMBODIMENT

Figure 1:
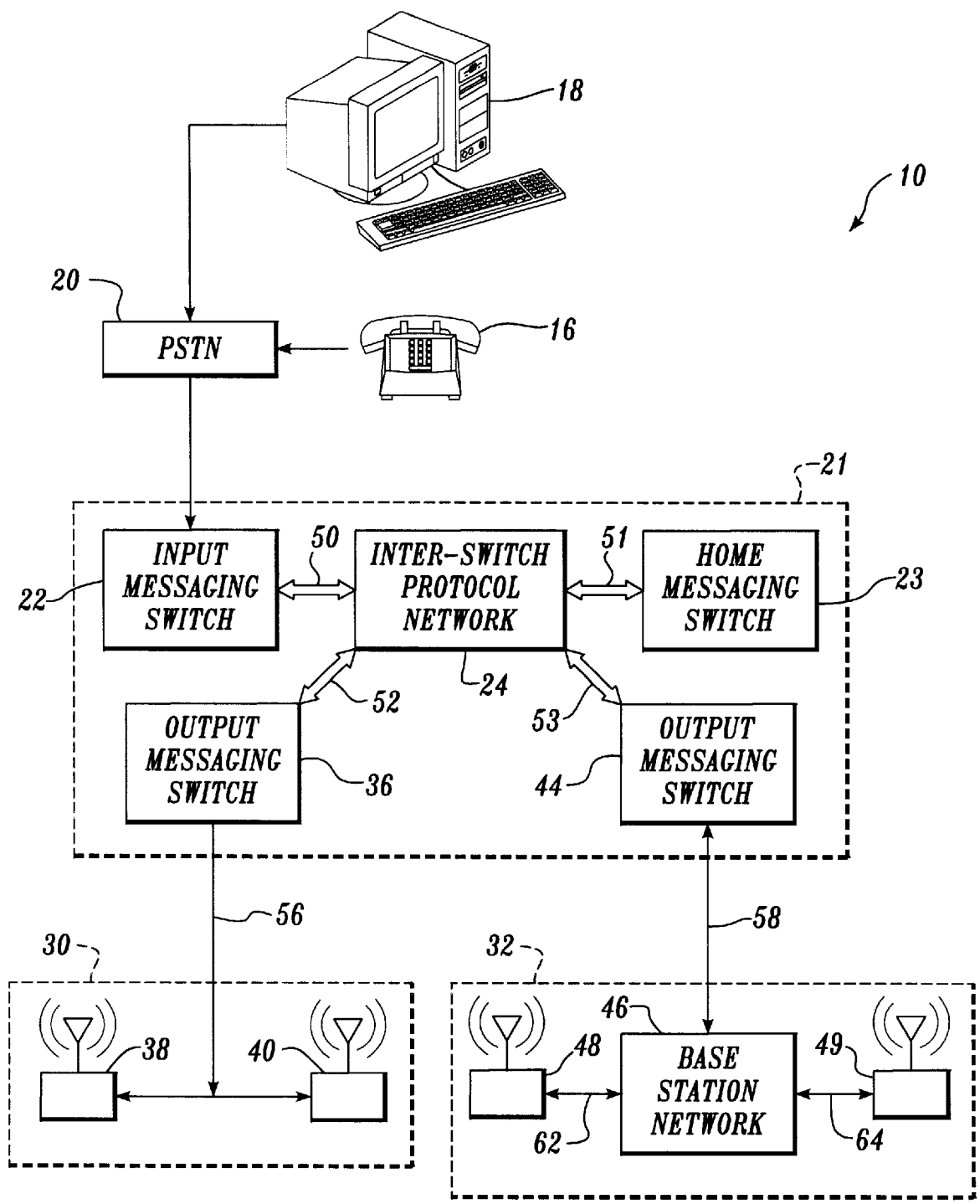
FIG. 1 is a typical wireless messaging or paging system.

As is well known in the art, a computer network is comprised of communicatively interconnected hardware capable of exchanging electronic information. Software operating within the hardware controls how information is sent over the communication connections.

Although the present invention is directed to computer networks in general, a preferred embodiment is used in constructing wireless messaging or paging systems. It is appreciated that while this detailed description focuses primarily on the field of wireless messaging or paging, the invention is applicable to computer networks used in other fields of art.

As a matter of background, a typical wireless messaging or paging system is illustrated by reference numeral 10 in FIG. 1. In wireless messaging system 10, messages are entered from either a standard telephone 16 or a computer 18 via a public switched telephone network 20. The messages are entered into an input messaging switch 22 that is an input component to a messaging switch network 21. The messages are then passed via a communication link 50 through an interswitch protocol network 24 to a home messaging switch 23 via a communication link 51. Communication links 50 and 51, as well as other communication links referred to hereafter, may be simple wires, leased telephone lines, microwave links, satellite links, or any other suitable communication path. The home messaging switch 23 contains subscription information specific to the subscriber for which the message is destined.

The messages are then transferred back through communication link 51 and interswitch protocol network 24 to a one-way output messaging switch 36 or two-way output messaging switch 44 via communication links 52 or 53, respectively, depending on the service to which the recipient has subscribed. Output messaging switches 36 and 44 are output components of the messaging switch network 21. Messages at output messaging switch 36 are sent via communication links 56 to a one-way transmitting system 30 and are broadcast via transmitting stations 38 and 40 to subscribers within their geographical region. Messages at output messaging switch 44 are sent to a two-way transmitting system 32 via communication link 58 and are processed through a base station network 46. Messages are then selectively sent via communication links 62 or 64 to base station 48 or 49, respectively, to be broadcast. Base stations 48 and 49 are capable of both broadcasting messages and receiving signals from remote messaging devices. Although shown here in limited number, a wireless messaging or paging system 10 may have any number of input 22, home 23, or output 36, 44 messaging switches as well as base station networks 46 and transmitters 38, 40, 48, and 49.

In FIG. 1, input messaging switch 22 and home messaging switch 23 are shown separately with separate communication links 50 and 51. Nevertheless, in terms of physical equipment both individual switches may be housed at the same location within a single box (not shown). Similarly, a single box may contain a plurality of individual switches of the same type, e.g., multiple home or input messaging switches. A box which houses one or more individual switches may also, as a whole, be referred to as a "switch." Hereinafter, references to "individual switch" refer to individual input 22, home 23, or output 36, 44 messaging switches while references to "switch" generally refer to boxes housing one or more individual switches. All individual input 22, home 23, or output 36, 44 messaging switches, whether they be individually or collectively housed in a switch, are communicatively interconnected via the interswitch protocol network 24.

In the preferred embodiment of the invention, the interswitch protocol network 24 is a fully interconnected TCP/IP network. The interswitch protocol network 24 operates in a connectionless mode, meaning that individual switches 22, 23, 36, and 44 are configured so they are each capable of communicating with one another and assuming that each other is ready to respond to information or service requests.

However, as noted above, communication links 50, 51, 52, and 53 are preferably governed by TCP/IP, a connection-oriented protocol, which requires a communication link to be set up before any information or service requests can be exchanged between switches. In order for communication links between switches to always be open and ready to convey information, each switch has "association establishment" capabilities built into its controlling software. One aspect of association establishment is to establish and maintain open TCP connections with other switches in the network 21.

As with most computer networks, software is used to control communication between switches. Individual input 22, home 23, output 36, or output 44 switches are represented within the interswitch protocol network 24 by abstract software entities called "nodes." Each node has an identifier that uniquely identifies it. Since each individual switch that is active within the network is represented by a node, a switch housing multiple individual switches has a corresponding number of nodes addressable within it.

Each time an individual switch is added to the messaging switch network 21, the individual switch must have a node assigned to it to represent it within the network. The node assigned may be a newly-created node or it may be an existing node reassigned from another individual switch. An individual switch may be added to the network by joining it with other individual switches collectively housed in a switch. Alternatively, an individual switch may be added as a switch of its own. Once an individual switch is identified to the network by a node, it is capable of receiving and sending messages to other nodes.

Communication between individual switches is made possible when the node that represents an individual switch is aware of, or has an "association" with, the node that represents another individual switch. To provide means for maintaining associations, each switch maintains, in memory or any other suitable storage media, a database of node configurations that the switch has learned of. As described in greater detail below, switches learn of other nodes existing in the network through "advertisements" generated by the other switches. The database of node configurations, or "association database", that each switch maintains is accessible by each node addressed within the switch.

As stated, each switch may maintain a database of information on the configuration of abstract nodes addressable both within the switch itself and within other switches. Once information regarding the configuration of a node is added to a database, an association is said to exist between that node and all nodes assigned within the switch maintaining the database. Each node assigned within the switch is capable of generating and sending messages to other nodes known in the association database maintained by the switch. A node sending a message to another node first references its switch's database to learn where the other node is addressed. As will become more evident, when nodes are reassigned from one switch to another (thus causing their network address to change), means are provided for databases to be updated to reflect the current assignment of nodes, thus assisting nodes sending messages to properly address messages to the other nodes' respective current address. In this manner, the preferred embodiment of the invention exercises communication control in the network by enabling communication between nodes according to associations determined to be most current.

It is important to note that abstract nodes are entities independent of one another. When a node needs to send the same message to two different recipient nodes, it generates two separate identical messages, and sends one to each corresponding recipient node. This is true even if both recipient nodes are addressable within the same switch.

The configuration of a node is comprised of several elements including a node identifier, an address, and an "era" value. A node identifier, typically a sequence of numbers, is unique throughout the network and serves to identify a node within the network.

A node's address indicates the node's communicative location in the network and permits communication between nodes to be properly directed. Typically, a node's address is an actual network address in the computer network though it may be a code that can be translated to provide an actual network address.

It is important to note that a node's identifier is independent of the node's address. A node identifier does not change, even if the node is reassigned to represent a different individual switch. A reassignment to represent a different individual switch, however, may cause the node's address to change.

A node configuration also includes an "era" value that serves to indicate an era or time reference for which the associated configuration information is operative. Briefly stated, when a node's configuration is changed, it enters a new era in which the new configuration is operative. The era value is modified to reflect that new era of operation. In the preferred embodiment, the era value is increased for each new era of operation. By evaluating the era value in a node's configuration, other components in the computer network (here, switches in a wireless messaging network) may detect whether the node's configuration information is from a previous era (and thus out-of-date) or reflects a more current state of operation for the node. Since each node is independent of other nodes, different nodes may have different era values. An era value is relative only to the node of which it forms part.

As stated earlier, each switch maintains an association database that is accessible by each node addressed within the switch. FIG. 2 illustrates an association database 130 that may be maintained by a switch in the network. Although the association database 130 is configured as a table with each row of the table representing configuration information of a given node, association databases may be configured and stored in switches by other means known in the art. As nodes are added or deleted from the database 130, so are rows in the table.

In the first column 132 of the database 130, a node identifier is recorded for each listed node, here shown as Node1, Node2, Node3, etc. The information on each node includes the address 134 of the node within the network. Furthermore, each node's era value is recorded as shown in column 136. Preferably, association databases also include information indicating the present status of the configuration information listed for each node. A field for status information is shown at column 138. As discussed later, status information may indicate such things as "O.K.", "Error", or "Ignore."

To provide a more concrete illustration of the invention, refer to FIG. 3 and suppose, for example, a network includes switch A and switch B. Furthermore, switch A presently houses individual switches represented by nodes with identifiers A1 and A2. Similarly, switch B houses individual switches represented by nodes with identifiers B1 and B2. FIG. 3 illustrates association databases 200 and 206 that may be maintained by switch A and switch B, respectively. Rows 202 and 204 of database 200 in switch A show nodes A1 and A2 addressable at switch A, each with a respective era value of 1996, and a present status of "O.K."

In similar fashion, the association database 206 maintained by switch B lists, at rows 208 and 210, nodes B1 and B2, addressable at switch B, each with a respective era value of 1996, and a status of "O.K." Note that column titles "Node", "Address", "Era" and "Status" are not necessarily part of the actual association databases maintained by switches. Rather, they are used here to clarify the illustration.

Steps to establish associations are typically undertaken when a node is created or reconfigured. Until further action is taken, established associations remain active. Preferably, association establishment for each node operates as an "auto-connect" feature, that is, switches automatically set up associations with other nodes when a node is created or reconfigured in the switch. In the preferred embodiment, a node's era value is 0 (zero) when first created. However, any number is suitable for an initial era value.

Figure 4:
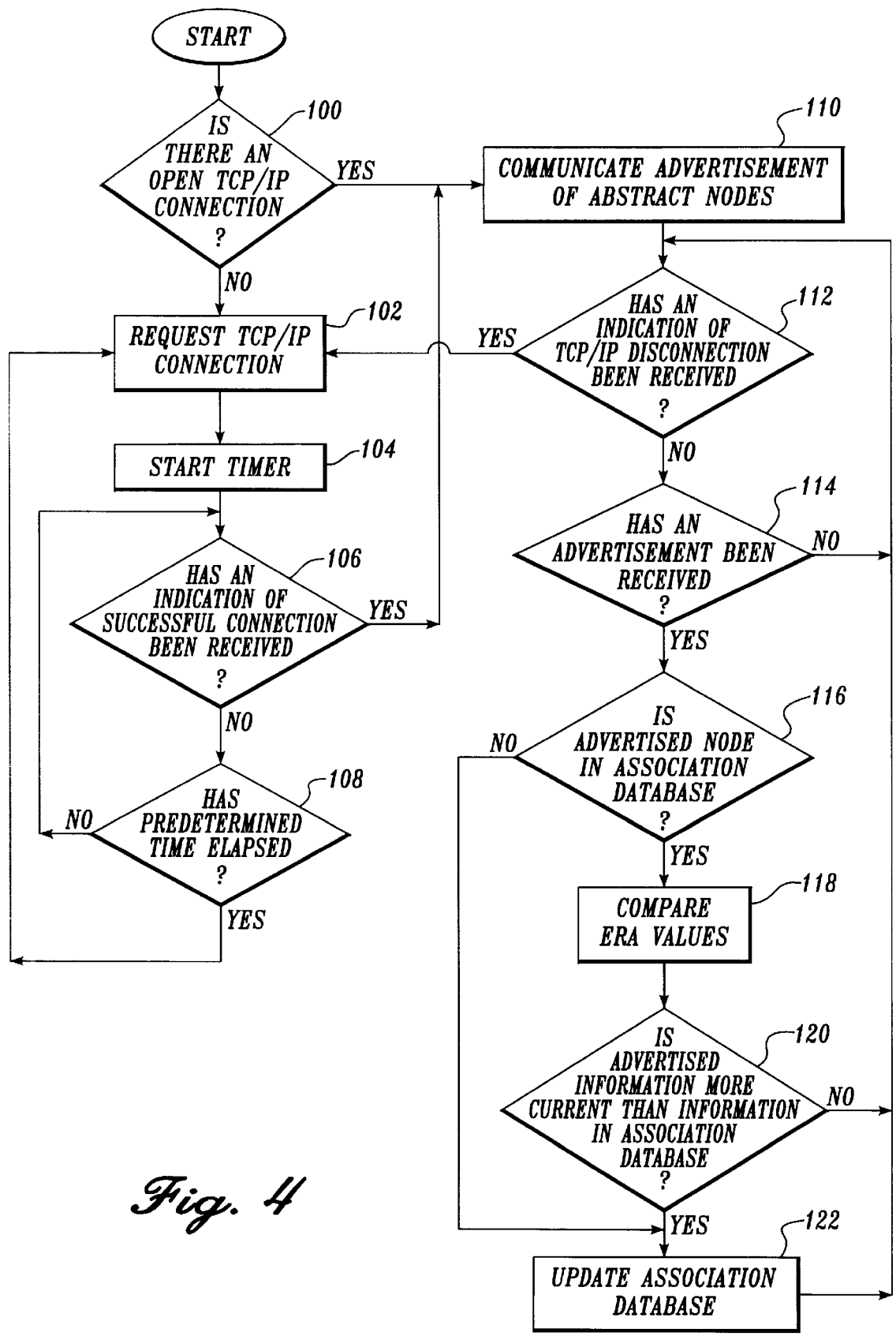
FIG. 4 is a flow diagram of association establishment logic.

Because an association is established when a node knows, via an association database, the identifier and address of another node, means are provided for a switch to advertise information about the nodes addressable within it to other switches (and hence, other nodes) in the network. FIG. 4 describes the logic employed in the preferred embodiment. At logic box 100 a switch initiates association establishment by detecting whether an open TCP connection with other switches in the network exists. If an open TCP connection does not exist between the switch and another switch, the switch requests at box 102 that a TCP connection be opened. At box 104, a timer is started. The switch waits for an indication of successful TCP connection at box 106. If such an indication is received, the switch then communicates at box 110 to other switches in the network an advertisement describing the configuration of nodes presently addressable within the switch. If such an indication has not been received, the switch evaluates the timer at box 108 to determine whether a predetermined time has elapsed. If such time has elapsed, the switch repeats its request at box 102 that a TCP connection be opened. If the predetermined time has not elapsed, the switch continues to wait at box 106 for an indication of successful TCP connection.

Once an open TCP connection is confirmed, the switch communicates at box 110 an advertisement listing one or more of the nodes currently addressable within the switch. In the preferred embodiment, all nodes currently addressable within the switch are advertised in a single advertisement. As shown in FIG. 5, an advertisement includes several elements. Preferably, an advertisement begins with an indication 140 that it is an association establishment message. The indication 140 may also denote the switch or switch address originating the advertisement, thus indicating where listed nodes may be addressed. An advertisement further provides information regarding the configuration of each node, including node identifiers 142 and 146 and respective era values 144 and 148. As shown at 150, an associate establishment advertisement may continue on to list any or all nodes currently addressable within the switch. If the indication 140 does not explicitly identify the address of the listed nodes, the switch receiving the advertisement may presume the listed nodes are addressable at the switch generating the advertisement. In addition, the advertisement shown in FIG. 5 is only an illustrative, non-limiting example; actual advertisement messages may be configured as needed. The advertisement is then communicated to other switches in the network.

In the case that a node is removed from a switch, in the preferred embodiment an advertisement listing all remaining nodes in the switch is sent out with the removed node purposefully omitted. All switches receiving the advertisement reconfirm associations with the listed nodes while the association with the omitted node, by its nature of being left out, is deactivated or deleted from their respective association databases. Deactivation may be accomplished by changing the status field of the omitted node's association to "Ignore." In this case, the status serves to indicate that the associated node information is "out-of-date" and thus should be ignored.

Alternatively, a switch may generate a separate advertisement for each node. When a node is removed, a separate advertisement is sent indicating that the node has been removed. In the case that a switch has no nodes, an empty advertisement is sent.

Whenever a TCP connection disconnects or becomes unavailable, association establishment software within a switch reestablishes the connection and rebroadcasts an advertisement of its nodes. As shown at logic box 112 in FIG. 4, the switch determines whether it has received an indication that the TCP link has been disconnected. If such an indication has not been received, the switch determines whether an association advertisement has been received at box 114 from another switch. If such an advertisement has not been received, the switch repeats the process of detecting whether an indication of disconnection at box 112 or an advertisement at box 114 has been received.

If an indication of TCP disconnection has been received, the switch begins the process of reestablishing the TCP connection, as discussed earlier (see logic boxes 102, 104, 106, and 108).

If the switch receives an association advertisement, the switch begins a process of comparing the advertised information with information maintained in its association database. For each advertised node, the switch determines at box 116 whether an advertisement of that particular node has been previously received and recorded in the switch's association database. This determination is performed by comparing the identifier of the advertised node with the identifiers of nodes in the switch's association database. Since node identifiers are unique, matching identifiers indicate that an advertisement of that node has been previously received and recorded. If the advertised node is not presently recorded in the association database, the association database is updated at box 122 by recording the advertised node's configuration information. The recorded information includes the advertised era value for the node.

For each advertised node found previously recorded in the switch's association database, the switch compares at box 118 the era value of the advertised node with the era value of the same node as found in the switch's association database. Preferably, the comparison is implemented as a two's complement subtraction operation. Using two's complement arithmetic, the previously recorded era value, as found in the association database, is subtracted from the advertised era value of the same node. If the result is a positive number, the advertised era value is greater than the previously recorded era value. Since a node's era value is increased each time the configuration of the node changes (thus causing the node to enter a new "era" of operation), a greater era value indicates a more current configuration of the node.

As used here, the term "greater" does not necessarily signify higher value in ordinary arithmetic. It means that the two's complement subtraction results in a positive number. For example, in the preferred embodiment, era values are implemented as signed 8-bit numbers. Accordingly, era values range from −128 to 127. If an advertised era value is 127 and a recorded era value is 126, subtraction of the latter from the former yields a positive 1, as is expected even in ordinary arithmetic. Suppose that the node configuration then changes and accordingly its era value progresses. An era value of 127 progresses by "wrapping around" to −128. Subsequently, when a recorded era value of 127 is subtracted from the now advertised era value of −128, ordinary arithmetic for −128 minus 127 yields −255. However, due to the nature of signed 8-bit numbers and two's complement arithmetic, −255 appears as the value 1, which, being positive, informs the switch that the advertised era value of −128 is "greater" and thus more current.

When a switch detects that the advertised information is more current at box 120, the switch updates at box 122 its association database to record the more current node configuration. This recordation includes a recording of the advertised era value. After completing analyses 116, 118, and 120 of each advertised node and updating 122 its association database when necessary, the switch returns to detecting whether an indication of TCP disconnection at box 112 or advertisement at box 114 has been received.

Continuing with the example illustrated by FIG. 3, suppose that switch A generates an association advertisement disclosing the state of nodes A1 and A2 as presently addressable within switch A. This advertisement may take the format as shown in FIG. 6A. In FIG. 6A, box 220 indicates that the advertisement is for association establishment. It further indicates that the nodes listed thereafter are addressable at switch A. At boxes 222 and 226, nodes A1 and A2 are identified. The advertisement includes each node's era value, shown at boxes 224 and 228, respectively. Both advertised nodes have an era value of 1996.

Switch A communicates this advertisement through the network where it is subsequently received by switch B. Switch B thereafter compares the advertisement with its association database (see FIG. 3 at 206). Since neither nodes A1 or A2 are presently listed, the information about both nodes is added to the database as shown at rows 236 and 238 of FIG. 6B, resulting in the updated association database 230. Information on nodes B1 and B2, shown at rows 232 and 234, remain in the database 230. At this point, nodes B1 and B2, assigned to individual switches in switch B, have an "association" and are therefore capable of communicating with nodes A1 and A2. When communication with nodes A1 or A2 is desired, nodes B1 and B2 will direct the communication to switch A as that is where B1 and B2 understands A1 and A2 to be addressed.

As stated earlier, the configuration of each node includes an era value. Era values are useful in helping prevent confusion that would otherwise arise in a situation where two different switches advertise the same node as being addressable within it. An era value serves as a time reference for which the configuration information of the particular node is operative. Whenever a node within the system undergoes a configuration change, it enters a new "era" or time frame of operation. For instance, if an output node is moved from one switch to another, a change in era would be indicated by an increase in the node's era value. If for some reason the former switch started to advertise the output node no longer addressable within it, all other switches receiving that advertisement would know to ignore the information because its era value would be lesser than the node's latest advertised era value, thus indicating that the former switch's advertisement is from a previous era and is "out-of-date."

For instance, continuing with the example originating in FIG. 3, suppose the network includes switch C in addition to switch A and switch B. Further suppose that switch C houses an individual switch capable of performing the tasks performed by the individual switch represented by node A1, and that the operator of switch C desires switch C to take over those tasks. In effectuating a transfer of node A1 from switch A to switch C, thus permitting all tasks directed to node A1 to be performed in switch C, switch C may act independently of other switches. Switch C may "take over" node A1 by communicating to the network an advertisement listing node A1 as addressable within switch C. Since node A1 is undergoing a change in configuration (moving from switch A to switch C), the era value of node A1 is incremented, thus indicating to the network a new era or time frame in which this configuration is operative. For illustrative purposes, FIG. 7A shows an advertisement 244 from switch C which lists node A1 and an associated new era value of 1997 shown at boxes 246 and 248, respectively. Note that the era value has incremented from the era value of 1996 shown at FIG. 3, row 202. At row 242 in FIG. 7B, the association database 240 in switch C is shown listing newly acquired node A1, addressable at switch C, with an era value of 1997 and status "O.K."

When switch A receives the advertisement 244, it proceeds to compare the advertised information with its association database (see FIG. 3 at 200). Upon finding information about node A1 already in the database 200, as shown at row 202, switch A proceeds to discover whether the advertised information is more current by comparing the advertised era value 248 (FIG. 7A) with the recorded era value 202. By subtracting the recorded era value of 1996 from the advertised era value of 1997, the result is 1 which, being a positive number, indicates that the advertised information is more current.

As a result of evaluating the era values, switch A discovers that node A1 has advanced to another era, and, in that era, node A1 is addressable at switch C, where, in the previous era, it was addressable at switch A. To update its association database to reflect the current state of node A1, switch A adds the new association as shown at row 256 in FIG. 8. In the preferred embodiment, switch A updates the status of its previous information on node Al, shown at row 252, to list an "Error." In this case, the Error status serves as a warning flag to the operator of switch A that a node previously addressable in switch A has been "taken over" by another switch (possibly by another operator). The Error status preferably remains until the operator of switch A acknowledges the take over event by switch C. In an alternate embodiment, switch A may update its association database 250 by overwriting the previous information about node A1 at row 252 with the advertised information shown at row 256. In any event, the information about node A2 at row 254 remains unaffected.

Similarly, when switch B receives the advertisement 244, it proceeds to compare the advertised information with its association database (see FIG. 6B at 230). Upon finding information about node A1 already in the database 230, as shown at row 236, switch B proceeds to discover whether the advertised information is more current by performing a similar comparison as done by switch A. Switch B discovers that node A1 has advanced to another era, and in that era node A1 is addressable at switch C. Switch B updates its association database to reflect the current state of node A1 by adding the new association shown at row 272 in FIG. 8. In the preferred embodiment, switch B updates the status of its previous information on node A1, shown at row 268, to list "Ignore." In this case, the status serves to indicate that the associated node information shown at row 268 is out-of-date and thus should be ignored. The Ignore status preferably remains until the operator of switch B acknowledges the take over event by switch C. Alternatively, switch B may update its association database 260 by overwriting the previous information about node A1 at row 268 with the advertised information shown at row 272. Again, in any event, the information about node A2, as well as nodes B1 and B2, shown at rows 270, 262, and 264 respectively, remains unaffected.

FIG. 8 also illustrates the new association database 280 maintained by switch C. Switch C's association database 280 lists the node it took over, node A1, at row 282. In all instances of the new configuration of node A1, the new era value of 1997 is reflected.

It is important to note that for switch C to take over node A1 from switch A, only switch C needed to act. Even though node A1 was previously addressable at switch A, neither permission to take over or an indication of relinquishment of node A1 was required of switch A. This feature results from the fact that, in the invention, an era value is independently a part of the configuration of each node. Each node is an abstract entity which is not "owned" by any given switch. It is an entity unto itself with its own era number. Era numbers do not need to be coordinated or assigned by any particular switch. However, era values may be coordinated using a mechanism such as a network resource, described hereafter, for a higher degree of control and automation.

When a node is reassigned to represent another switch and its new status is advertised, all other switches will immediately recognize, via the node's era value, that the node has changed its configuration, in this case by moving to another switch. As a consequence, a node is capable of transferring from one switch to another without any one fixed switch having to keep track of its current network address.

An advantage of this feature is that several different individual switches can be configured to control the same resource and perform the same tasks and therefore be represented by the same node, though not simultaneously. Rather the node may be reassigned from one individual switch to another as needed. When a node is reassigned from one individual switch to another, control of a resource and responsibility for certain tasks also follow. By the use of era values, switches in the network will be able to determine the node's current era and thus sort out at which switch the node is currently addressed. In particular, this allows the network to implement a more efficient "hot-standby" mode of operation.

Under the "hot-standby" aspect of the invention, a switch may stand ready to "take over" a node if the switch where the node is presently addressed fails or disconnects from the network. The hot-standby switch takes over the node by immediately advertising to the rest of the network that the node is in a new era and in that new era, the node is addressable at the hot-standby switch. All further communication with the node will be directed to the hot-standby switch. The hot-standby switch assumes control of the resources and responsibilities for tasks previously performed by the original switch. When the original switch once again becomes functional, it may choose to reacquire the node and reassert its control over the resource by advertising that the node has entered an even newer era and in that era the node is addressable back at the original switch.

An advantage of using era numbers to implement a hot-standby mode of operation is that the hot-standby device does not have to share the same network address as the main, original device for which it is serving as back-up, thus permitting the hot-standby device to be addressable anywhere within the system. By not having to use the same network address, the hot-standby device does not have to be addressed in the same subnet as the main device. Furthermore, the hot-standby device does not have to be physically housed near the main device but can be anywhere with a communication connection in the network. Using an era value integral to a node to indicate a time reference of operation allows the node to move from one switch to another without requiring a fixed owner switch to keep track of its current address.

In a further embodiment of this invention, network devices (here, switches) can share entire association databases and thereby compile association databases that are more accurate than each database may be independently. In this embodiment, a switch generates an advertisement that not only lists nodes currently addressable within the switch but also lists the known configuration of nodes addressable within other switches. The switches receiving this advertisement would evaluate the era values in the advertised configurations to determine whether the listed configurations are more current than the configurations already recorded in their databases. Databases are updated accordingly to reflect the configurations determined to be more current. Evaluation of era values is performed as described earlier where greater era values indicate a more current time reference in which the configuration is operative.

An embodiment of this invention may also use a network resource for automatically coordinating node era values. Such a network resource would associate an era value with each node defined in the network. When a network device wishes to take over a node and needs to know which era to advertise for that node, the network device would request from the network resource a "take over" era value for that node. The network resource would dispense an era value for the node that, when advertised, would signify it had entered a new era.

The "take over" event does not have to be imminent. As stated earlier, in a "hot-standby" mode of operation, a hot-standby device stands ready to take over for a primary device in the event that, at some point in the future, the primary device fails or otherwise becomes unavailable to the network. In using a network resource to coordinate era values, the hot-standby device would request a "take over" era value for the node representing the primary device. Then, at any subsequent moment, possibly in the distant future, the hot-standby device can independently advertise that era and take over the node.

While the preferred embodiment of the invention has been illustrated and described, particularly in relation to a wireless messaging or paging interswitch network it will be apparent that various changes can be made therein without departing from the spirit and scope of the invention.

The embodiments of the invention in which an exclusive property or privilege is claimed are defined as follows:

1. In a computer network including a plurality of communicatively interconnected components and a plurality of abstract nodes, a method for a single component of the plurality of components to communicate information about an abstract node's configuration to at least one other component, the method comprising:
 (a) defining the configuration of the abstract node to include an era value for identifying a time reference for which the configuration is operative, the configuration being modifiable by more than one component in the computer network,
 (b) generating an advertisement disclosing information on the configuration of the abstract node, the advertisement including the era value of the configuration;
 (c) communicating the advertisement to the at least one other component; and
 (d) if the at least one other component has previously received configuration information of the abstract node, then comparing the era value included in the advertisement with the era value included in the previously received configuration information to determine whether the configuration information disclosed in the advertisement is more current.

2. The method of claim 1, wherein the comparison of era values is accomplished by using two's complement arithmetic to subtract the era value included in the previously received configuration information from the era value included in the advertisement.

3. The method of claim 2, wherein the era values are signed, 8-bit numbers.

4. The method of claim 3, wherein the comparison indicates that information in the advertisement is more current if the subtraction results in a positive number.

5. The method of claim 1, further comprising maintaining a database accessible to the at least one other component for storing information from the advertisement if the information in the advertisement is determined to be more current than any previously received configuration information of the abstract node.

6. The method of claim 5, wherein the components of the computer network are switches in a wireless messaging or paging system and the computer network is an interswitch network in the wireless messaging or paging system.

7. The method of claim 6, wherein configuration information recorded in the database further includes status information for identifying the status of the recorded configuration information.

8. The method of claim 7, wherein the status information functions as a warning flag.

9. The method of claim 7, wherein the status information indicates that the associated configuration information may be ignored.

10. An improved computer network comprising a plurality of communicatively interconnected components and a plurality of abstract nodes, wherein the plurality of abstract nodes operates to represent the interconnected components in the network, the configuration of each abstract node defined to include an era value for identifying a time reference for which the configuration of the abstract node is operative, the configuration of an abstract node being modifiable by more than one component in the network, wherein advertisements disclosing information on the configuration of one or more abstract nodes are generated and communicated through the network to the components, the components receiving the advertisement having means to determine whether an advertised node configuration is more current than previously received configuration information of the same node and to store advertised node configuration information in a database for maintaining information on the configuration of abstract nodes.

11. The computer network of claim 10, wherein communication between the components is enabled according to node configurations determined to be more current.

12. The computer network of claim 11, wherein the components of the computer network are switches in a wireless messaging or paging system and the computer network is an interswitch network in the wireless messaging or paging system.

13. The computer network of claim 10, wherein a component capable of storing node configurations in a database has the further capacity to communicate the contents of the database to another component.

14. The computer network of claim 10, wherein the network further comprises a network resource for coordinating node era values.

15. In a computer network having a plurality of communicatively interconnected devices, a method for switching control of a resource from a first device to a second device, each device having a network address in the computer network, wherein the first device, configured to control the resource, is represented in the computer network by an abstract node defined by elements including an era value for identifying a time reference for which configuration of the abstract node is operative, and wherein the second device has also been configured to control the resource but control of the resource by the second device is not active, the method comprising the second device
   (a) changing the configuration of the abstract node making the abstract node addressable at the network address of the second device;
   (b) modifying the era value of the abstract node to a new era value indicative of a new time reference of operation;
   (c) generating an advertisement having
      (i) the configuration information of the abstract node which indicates that the abstract node is addressable at the network address of the second device, and
      (ii) the new era value that, when compared with an era value included in previous configuration information of the abstract node, distinguishes a more current time reference in which the configuration is operative; and
   (c) communicating the advertisement to at least one other device in the network.

16. The method of claim 15, wherein the plurality of devices are switches in a wireless messaging or paging system and the computer network is an interswitch network in the wireless messaging or paging system.

17. The method of claim 15, wherein the comparison of era values is accomplished by using two's complement arithmetic to subtract the era value included in previous configuration information of the abstract node from the new era value.

18. The method of claim 17, wherein the era values are signed, 8-bit numbers.

19. The method of claim 18, wherein the comparison indicates that information in the advertisement is more current if the subtraction results in a positive number.

20. A method for a switch in a wireless messaging or paging interswitch network to detect communicated configuration information that is more current, the network including a plurality of communicatively interconnected switches and a plurality of abstract nodes, the configuration of each abstract node defined to include an era value for identifying a time reference for which the configuration is operative, the configuration being modifiable by more than one switch in the interswitch network, the method comprising:
   (a) receiving an advertisement communicated from another switch, the advertisement disclosing information on the configuration of an abstract node including the node's era value;
   (b) determining whether configuration information on the node has been previously received;
   (c) if configuration information on the node has been previously received, comparing the era value included in the advertisement with the era value included in the previously received configuration information to determine whether the configuration information disclosed in the advertisement is more current; and
   (d) recording the advertised configuration information in a database maintained by the switch if the configuration information is determined to be more current or if configuration information on the node has not been previously received.

21. The method of claim 20, wherein the comparison of era values is accomplished by using two's complement subtraction.

* * * * *

UNITED STATES PATENT AND TRADEMARK OFFICE
CERTIFICATE OF CORRECTION

PATENT NO. : 5,913,921
DATED : June 22, 1999
INVENTOR(S) : J.P.R. Tosey et al.

It is certified that error appears in the above-identified patent and that said Letters Patent is hereby corrected as shown below:

COLUMN      LINE

15      44      "(c) communicating" should read --(d) communicating--
(Claim 15, line 28)

Signed and Sealed this

Twenty-third Day of November, 1999

Attest:

Q. TODD DICKINSON

*Attesting Officer*    *Acting Commissioner of Patents and Trademarks*